(12) United States Patent
Kanda et al.

(10) Patent No.: US 8,197,970 B2
(45) Date of Patent: Jun. 12, 2012

(54) LITHIUM BATTERY

(75) Inventors: Ryoko Kanda, Itami (JP); Nobuhiro Ota, Itami (JP); Takashi Uemura, Itami (JP); Kentaro Yoshida, Itami (JP); Mitsuyasu Ogawa, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 311 days.

(21) Appl. No.: 12/208,497

(22) Filed: Sep. 11, 2008

(65) Prior Publication Data
US 2009/0068563 A1 Mar. 12, 2009

(30) Foreign Application Priority Data

Sep. 11, 2007 (JP) .................. 2007-235885
Mar. 14, 2008 (JP) .................. 2008-066685
May 28, 2008 (JP) .................. 2008-139245

(51) Int. Cl.
*H01M 4/13* (2010.01)
*H01M 4/58* (2010.01)
*H01M 2/16* (2006.01)
*H01M 2/14* (2006.01)
*H01M 2/18* (2006.01)
*H01M 4/82* (2006.01)
*H01M 6/00* (2006.01)

(52) U.S. Cl. .............. 429/231.95; 429/248; 429/129; 429/142; 29/623.5

(58) Field of Classification Search ............ 429/231.95, 429/248, 129, 142; 29/623.5
See application file for complete search history.

(56) References Cited

U.S. PATENT DOCUMENTS

| 6,337,132 B1 * | 1/2002 | Kajiyama et al. ............ 428/403 |
| 6,511,516 B1 * | 1/2003 | Johnson et al. .............. 29/623.1 |
| 7,615,314 B2 * | 11/2009 | Kawakami et al. ........ 429/231.8 |

FOREIGN PATENT DOCUMENTS

| DE | 19735803 | 2/1999 |
| EP | 1928051 | 6/2008 |
| EP | 1928051 A1 * | 6/2008 |
| WO | 2007/034709 | 3/2007 |

OTHER PUBLICATIONS

Takada et al. (Interfacial modification for high power solid state lithium batteries, Solid Sate Ionics, 179 (2008), p. 1333-1337.*

(Continued)

*Primary Examiner* — Patrick Ryan
*Assistant Examiner* — Julian Anthony
(74) *Attorney, Agent, or Firm* — Osha Liang LLP

(57) ABSTRACT

A lithium battery includes a substrate, a positive electrode layer, a negative electrode layer, and a sulfide solid electrolyte layer disposed between the positive electrode layer and the negative electrode layer, the positive electrode layer, the negative electrode layer, and the sulfide solid electrolyte layer being provided on the substrate. In this lithium battery, the positive electrode layer is formed by a vapor-phase deposition method, and a buffer layer that suppresses nonuniformity of distribution of lithium ions near the interface between the positive electrode layer and the sulfide solid electrolyte layer is provided between the positive electrode layer and the sulfide solid electrolyte layer. As the buffer layer, a lithium-ion conductive oxide, in particular, $Li_xLa_{(2-x)/3}TiO_3$ ($x=0.1$ to $0.5$), $Li_{7+x}La_3Zr_2O_{12+(x/2)}$ ($-5 \leq x \leq 3$, preferably $-2 \leq x \leq 2$), or $LiNbO_3$ is preferably used.

18 Claims, 1 Drawing Sheet

OTHER PUBLICATIONS

Ohta et al. (LiNbO3-coated LiCoO2 as cathode material for all solid-state lithium secondary batteries, Electrochemistry Communications 9 (2007), p. 1486-1490.*

Fu et al. ( Surface modifications of electrode materials for lithium ion batteries, Solid State Sciences 8 (2006), 113-128.*

Narumi Ohta, et al., "Enhancement of the High-Rate Capacity of Solid-State Lithium Batteries by Nanoscale Interfacial Modification," Advanced Materials, ISSN 0935-9648, vol. 18, No. 17 dated Sep. 5, 2006, 5 pages.

European Search Report dated Feb. 2, 2009, issued in Application No. 08252960.3, 6 pages.

Ohta et al, "LiNb03-coated LiCo02 as cathode material for all solid-state lithium secondary batteries," Electrochemistry Communication, Elsevier, Amsterdam, NL, vol. 9, No. 7, Jun. 15, 2007, pp. 1486-1490, 5 pages.

Takada, K., et al, "Interfacial modification for high-power solid-state lithium batteries," Solid State Ionics, North Holland Pub. Company, Amsterdam, NL, vol. 179, No. 27-32, Sep. 30, 2008, pp. 1333-1337, 5 pages.

Narumi Ohta, et al., "Enhancement of the High-Rate Capability of Solid-State Lithium Batteries by Nanoscale Interfacial Modification," Advanced Materials, ISSN 0935-9648, vol. 18, No. 17 dated Sep. 5, 2006, 5 pages.

* cited by examiner

LITHIUM BATTERY

BACKGROUND OF THE INVENTION

1. Field of the Invention

The present invention relates to a lithium battery including a solid electrolyte layer.

2. Description of the Related Art

Lithium-ion secondary batteries (hereinafter, simply referred to as "lithium batteries") have been used as a power supply of relatively small electrical devices such as portable devices. Lithium batteries include a positive electrode layer, a negative electrode layer, and an electrolyte layer that mediates conduction of lithium ions between the positive electrode layer and the negative electrode layer.

Recently, as such lithium batteries, all-solid-state lithium batteries in which an organic electrolyte solution is not used for conducting lithium ions between a positive electrode and a negative electrode have been proposed. In all-solid-state lithium batteries, a solid electrolyte layer is used as an electrolyte layer. Accordingly, all-solid-state lithium batteries can eliminate disadvantages caused by the use of an organic solvent-based electrolyte solution, for example, a safety problem caused by leakage of an electrolyte solution and a heat-resistance problem caused by volatilization of an organic electrolyte solution at high temperatures higher than the boiling point of the electrolyte solution. As the solid electrolyte layer, a sulfide-based substance having a high lithium-ion conductivity and excellent insulating property is widely used.

While such all-solid-state lithium batteries including a solid electrolyte layer have the above-described advantages, the air-solid-state lithium batteries have a problem of a low capacity (i.e., unsatisfactory output characteristic) as compared with lithium batteries including an organic electrolyte solution. The cause of this problem is that since lithium ions are more easily drawn to oxide ions of a positive electrode layer than sulfide ions of the solid electrolyte layer, a layer where lithium ions are lacking (depletion layer) is formed in an area at the positive electrode layer side of the sulfide solid electrolyte (refer to Advanced Materials 2006. 18, 2226-2229 (Reference 1)). This depletion layer has a high electrical resistance because of the lack of lithium ions, and thus decreases the capacity of the battery.

To solve the above problem, according to a technique disclosed in Ref. 1, a surface of a positive electrode active material is coated with a lithium-ion conductive oxide. This coating limits the migration of lithium ions and suppresses the formation of the depletion layer in a sulfide solid electrolyte layer. As a result, an improvement in the output characteristic of a lithium battery is realized.

However, the lithium battery disclosed in Ref. 1 is disadvantageous to the demand expansion of lithium batteries due to the recent development of portable devices because the productivity for the lithium battery is low. Specifically, according to Ref. 1, coating is performed on a surface of an active material by electrostatic atomization. This coating performed by electrostatic atomization is technically difficult and complex. That is, the production cost of the lithium battery disclosed in Ref. 1 is high, and the production efficiency thereof is also low. Accordingly, it is difficult to meet the requirement of demand expansion of lithium batteries.

Furthermore, in recent years, there has been a demand for further reducing the thickness of lithium batteries used in portable devices. However, the lithium battery disclosed in Ref. 1 is disadvantageous in that it is difficult to reduce the thickness of the battery while maintaining the capacity. Specifically, in the lithium battery disclosed in Ref. 1, the amount of positive electrode active material occupying a positive electrode layer is decreased by an amount corresponding to the coating formed on the surface of the positive electrode active material. In addition, in the lithium battery disclosed in Ref. 1, the positive electrode layer is composed of a powdery positive electrode active material the surface of which has been coated, and it is believed that a binding agent for binding the powdery active material is contained in the positive electrode layer. As a result, the amount of active material occupying the positive electrode layer is decreased by an amount corresponding to the binding agent. That is, in order to maintain the capacity of the lithium battery disclosed in Ref. 1, the thickness of the positive electrode layer must be increased.

SUMMARY OF THE INVENTION

The present invention has been conceived in consideration of the above circumstances, and an object of the present invention is to provide a lithium battery having a high capacity and for which excellent productivity can be achieved though it includes a solid electrolyte. Another object of the present invention is to provide a lithium battery whose thickness can be reduced while maintaining the capacity thereof.

A lithium battery of the present invention includes a substrate, a positive electrode layer, a negative electrode layer, and a sulfide solid electrolyte layer that mediates conduction of lithium ions between the positive electrode layer and the negative electrode layer, the positive electrode layer, the negative electrode layer, and the sulfide solid electrolyte layer being provided on the substrate. In this battery, the positive electrode layer is formed by a vapor-phase deposition method, and a buffer layer that suppresses nonuniformity of distribution of lithium ions near the interface between the positive electrode layer and the sulfide solid electrolyte layer is provided between the positive electrode layer and the sulfide solid electrolyte layer.

According to the structure of the present invention, the formation of a depletion layer in the sulfide solid electrolyte layer can be suppressed. Accordingly, a lithium battery having a capacity comparable to that of known lithium batteries including an organic electrolyte solution can be provided.

As a method of forming the buffer layer on the positive electrode layer, a known method of forming a layer, such as a physical vapor deposition method or a chemical vapor deposition method, can be employed. Such a known method can be significantly easily performed, as compared with a method of forming a coating on the surface of an active material. Therefore, a lithium battery can be produced with high productivity.

Here, the lithium battery of the present invention has a thickness larger than that of known all-solid-state lithium batteries by an amount corresponding to the thickness of the buffer layer. However, the thickness of the lithium battery of the present invention can be significantly smaller than the thickness of the battery disclosed in Ref. 1 which is produced by preparing an active material in the same amount as that of the active material of the lithium battery of the present invention, and forming a coating on the surface of the active material. Furthermore, since the positive electrode layer of the lithium battery of the present invention does not contain a binding agent, the amount of positive electrode active material included in the positive electrode layer can be increased. Consequently, a lithium battery having a small thickness can be provided while a predetermined capacity is ensured.

As the material of the buffer layer included in the lithium battery of the present invention, a lithium-ion conductive oxide is preferable. Typical lithium-ion conductive compounds include oxides and sulfides. However, when the buffer layer is produced using a sulfide, a depletion layer may be formed at the positive electrode layer side in the buffer layer. Therefore, an oxide is preferably selected as the material of the buffer layer.

Examples of the lithium-ion conductive oxide include, $Li_xLa_{(2-x)/3}TiO_3$ (x=0.1 to 0.5), $Li_{7+x}La_3Zr_2O_{12+(x/2)}$ ($-5 \leq x \leq 3$, preferably $-2 \leq x \leq 2$), $Li_4Ti_5O_{12}$, $Li_{3.6}Si_{0.6}P_{0.4}O_4$, $Li_{1.3}Al_{0.3}Ti_{1.7}(PO_4)_3$, $Li_{1.8}Cr_{0.8}Ti_{1.2}(PO_4)_3$, $LiNbO_3$, $LiTaO_3$, and $Li_{1.4}In_{0.4}Ti_{1.6}(PO_4)_3$. Preferably, these compounds constituting the buffer layer have diffused into the positive electrode layer. When these compounds have diffused into the positive electrode layer, nonuniformity of distribution of electric charges in the positive electrode layer is suppressed to suppress the formation of a depletion layer, and in addition, the adhesiveness between the positive electrode layer and the buffer layer can be improved. These compounds may be used alone or in combinations.

Among the above-mentioned oxides, $Li_xLa_{(2-x)/3}TiO_3$ (x=0.1 to 0.5) has a high lithium-ion conductivity. Accordingly, when $Li_xLa_{(2-x)/3}TiO_3$ (x=0.1 to 0.5) is used as the buffer layer, a lithium battery having a large capacity can be provided. In addition, the use of $LiNbO_3$ as the buffer layer can also achieve an advantage of improving the capacity of the lithium battery. When the buffer layer contains $LiNbO_3$, the concentration of Nb diffused from the buffer layer at a position in the positive electrode layer 25 nm from the interface with the buffer layer in the thickness direction is preferably $1 \times 10^{-3}$ atomic percent (10 ppm) or more and 25 atomic percent or less. In such a diffusion state described above, the formation of a depletion layer in the positive electrode layer can be effectively suppressed, and a high adhesiveness between the buffer layer and the positive electrode layer can be achieved.

Among the above-mentioned oxides, there are some compounds that have higher lithium-ion conductivity in an amorphous state rather than a crystalline state. For example, $Li_xLa_{(2-x)/3}TiO_3$, $LiNbO_3$, and $LiTaO_3$ exhibit high lithium-ion conductivity in an amorphous state. In particular, $Li_xLa_{(2-x)/3}TiO_3$ exhibit high lithium-ion conductivity both in a crystalline state and in an amorphous state. An example of an indicator indicating whether the buffer layer is in an amorphous state is an indicator using X-ray diffractometry. For example, a typical indicator that specifically indicates whether a buffer layer containing $LiNbO_3$ is in an amorphous state is that no peak having a full width at half maximum of 5° or less is present in the range of 22° to 25° of 2θ in X-ray diffraction of the buffer layer.

The thickness of the buffer layer is preferably 1 μm or less. Although the buffer layer has lithium-ion conductivity, the lithium-ion conductivity of the buffer layer is lower than that of the solid electrolyte layer, which is specifically designed for lithium ion transport. Therefore, a thickness of the buffer layer exceeding 1 μm is not preferable because migration of lithium ions is blocked by the buffer layer. In addition, there is a need for increasing the thickness of the positive electrode layer as much as possible in order to produce a battery having a small thickness together with a capacity corresponding to a desired application. Also from this standpoint, the thickness of the buffer layer is preferably 1 μm or less. On the other hand, an excessively small thickness of the buffer layer decreases an effect of suppressing nonuniformity of distribution of electric charges in the solid electrolyte layer. Accordingly, the thickness of the buffer layer is preferably 2 nm or more.

In addition, the electronic conductivity of the buffer layer is preferably $1 \times 10^{-5}$ S/cm or less. If the buffer layer has a high electronic conductivity, polarization may occur in this layer, thereby forming a depletion layer.

Furthermore, the density d (g/cm³) of the buffer layer is preferably 92% or more of the theoretical density. For example, the theoretical density of $LiNbO_3$ is 4.64 g/cm³, and thus, the density d is preferably about 4.27 g/cm³ or more, more preferably 4.32 g/cm³ (about 93%) or more, and further preferably 4.36 g/cm³ (about 94%) or more. The theoretical density of $LiTaO_3$ is 7.46 g/cm³, and thus, the buffer layer preferably has a density of at least about 6.86 g/cm³ or more (92% or more of the theoretical density). If the density of the buffer layer is low, the effect of suppressing nonuniformity of distribution of electric charges in the solid electrolyte layer is decreased.

Furthermore, the performance of the lithium battery can be improved by appropriately designing the structure of the positive electrode layer. For example, by specifying the crystal orientation of a compound constituting the positive electrode layer, the lithium-ion conductivity among positive electrode/buffer layer/solid electrolyte layer is improved to suppress the formation of a depletion layer. Specifically, the ab-axis orientation in the positive electrode layer is controlled to be higher than the c-axis orientation. For example, in the case where a positive electrode active material contained in the positive electrode layer is a compound having a layered rock-salt structure when crystallized, e.g., $LiCoO_2$, $LiNiO_2$, or $LiNi_{0.5}Mn_{0.5}O_2$, the lithium-ion conductivity among the above layers can be improved by allowing the compounds to have a crystalline structure having a high (101) orientation. A more specific indicator is that the ratio of plane indices of the positive electrode layer satisfies the relationship (003)/(101) <10.

Furthermore, as described above, diffusion of a compound constituting the buffer layer in the positive electrode layer can effectively suppress the formation of a depletion layer and improve the adhesiveness between the positive electrode layer and the buffer layer. In general, an element constituting the positive electrode layer also diffuses into the buffer layer at the same time when the compound diffuses from the buffer layer into the positive electrode layer. In this case, the diffusion of the compound from the buffer layer to the positive electrode layer occurs within a relatively shallow range of the positive electrode layer, but the diffusion of an element from the positive electrode layer to the buffer layer tends to occur over the entire area of the buffer layer. In particular, when the element contained in the positive electrode layer reaches the solid electrolyte layer side of the buffer layer opposite the positive electrode layer, a further improvement in the battery performance can be expected. As regards a specific indicator, in the case where the positive electrode layer is composed of an active material containing a transition metal element, the mass ratio of the transition metal element to lithium (transition metal element/lithium) in the buffer layer at the interface with the solid electrolyte layer is preferably $1 \times 10^{-4}$ or more and $8 \times 10^{-1}$ or less. Examples of the transition metal element include Co in the case where the positive electrode active material is $LiCoO_2$, Mn in the case where the positive electrode active material is $LiMnO_2$, and Ni in the case where the positive electrode active material is $LiNiO_2$.

Furthermore, the surface roughness Ra of the positive electrode layer is preferably 1 nm or more and 40 nm or less. By specifying the surface roughness of the positive electrode layer, in forming the buffer layer on the positive electrode layer, a buffer layer having a sufficient and uniform thickness for suppressing the formation of a depletion layer can be formed. A more preferable lower limit of the surface roughness of the positive electrode layer is 6 nm. A more preferable upper limit of the surface roughness of the positive electrode layer is 25 nm.

In the lithium battery of the present invention, the presence of a buffer layer disposed between a positive electrode layer and a solid electrolyte layer can suppress the formation of a depletion layer in the solid electrolyte layer. As a result, the lithium battery of the present invention has a capacity higher than that of known all-solid-state lithium batteries, and thus can have a capacity comparable to that of known batteries including an organic electrolyte solution. In addition, the lithium battery of the present invention can be easily produced and excellent productivity can be achieved therefor, and the thickness of the battery can be reduced, as compared with the battery disclosed in Ref. 1.

DESCRIPTION OF THE PREFERRED EMBODIMENTS

Embodiments of the present invention will now be described with reference to the drawings.

In addition to a positive electrode collector layer, a positive electrode layer, a solid electrolyte layer, a negative electrode layer, and a negative electrode collector layer, all of which are included in a typical lithium battery, a lithium battery of the present invention further includes a buffer layer disposed between the positive electrode layer and the solid electrolyte layer. The lithium battery including these layers is broadly divided into three types of structures in accordance with the arrangement state of the layers. Accordingly, each of the structures will be sequentially described, and structures of the layers included in the battery will also be described in detail.

First Embodiment Laminated Structure

Figure 1:
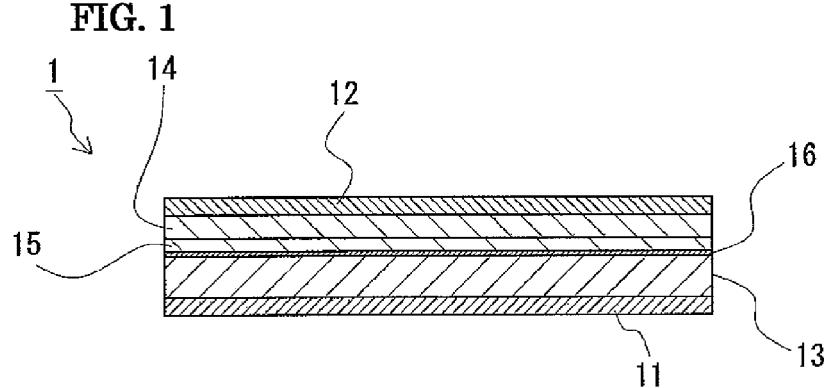
FIG. 1 is a longitudinal cross-sectional view of a lithium battery according to a first embodiment of the present invention.

<<Overall Structure>>
FIG. 1 is a longitudinal cross-sectional view of a lithium battery of this embodiment. A lithium battery 1 has a structure in which a positive electrode layer 13, a buffer layer 16, a solid electrolyte layer (SE layer) 15, a negative electrode layer 14, and a negative electrode collector layer 12 are laminated on a positive electrode collector layer 11 in that order.
<<Constitutional Components>>
(Positive Electrode Collector Layer)

The positive electrode collector layer 11 is a thin metal sheet having a predetermined thickness and also functions as a substrate supporting layers described below. As the positive electrode collector layer 11, one type of metal selected from aluminum (Al), nickel (Ni), an alloy thereof, and a stainless steel is preferably used. A collector 11 composed of a metal film can be formed by a physical vapor deposition method (PVD method) or a chemical vapor deposition method (CVD method). In particular, in the case where a metal film (collector) is formed so as to have a predetermined pattern, the collector having the predetermined pattern can be easily formed using an appropriate mask. Alternatively, the positive electrode collector layer may be formed by bonding a metal foil on an insulating substrate under pressure.
(Positive Electrode Layer)

The positive electrode layer 13 is a layer containing an active material occluding and releasing lithium ions. In particular, an oxide such as lithium cobalt oxide ($LiCoO_2$), lithium nickel oxide ($LiNiO_2$), lithium manganese oxide ($LiMn_2O_4$), olivine-type lithium iron phosphate ($LiFePO_4$), or $LiNi_{0.5}Mn_{0.5}O_2$ or a mixture thereof can be preferably used. By specifying the crystal structure of the positive electrode layer containing the above-mentioned compound, the lithium-ion conductivity can be improved. For example, in the case where a compound having a layered rock-salt structure (e.g., $LiCoO_2$, $LiNiO_2$, or $LiNi_{0.5}Mn_{0.5}O_2$) is used as the active material of the positive electrode layer, the ratio of plane indices of the positive electrode layer preferably satisfies the relationship $(003)/(101)<10$.

In addition, preferably, a compound contained in a buffer layer described below has diffused into the positive electrode layer. For example, by measuring the concentration of the compound in the positive electrode layer at a position a predetermined depth from the interface with the buffer layer, the degree of diffusion of the compound from the buffer layer to the positive electrode layer can be specified. A specific numerical value specifying the degree of diffusion will be described in item of buffer layer below. Here, an element contained in the positive electrode layer also diffuses into the buffer layer at the same time during the diffusion of the compound from the buffer layer to the positive electrode layer. The diffusion of the compound from the buffer layer to the positive electrode layer occurs within a relatively shallow range of the positive electrode layer, but the diffusion of an element from the positive electrode layer to the buffer layer tends to occur over the entire area of the buffer layer. In particular, the element contained in the positive electrode layer preferably reaches the solid electrolyte side of the buffer layer opposite the positive electrode layer. A specific numerical value can be specified as follows. In the case where the positive electrode layer is composed of an active material containing a transition metal element, the mass ratio of the transition metal element to lithium (transition metal element/lithium) in the buffer layer at the interface with the solid electrolyte layer is preferably $1\times10^{-4}$ or more and $8\times10^{-1}$ or less. The diffusion of the compound from the buffer layer to the positive electrode layer and the diffusion of the element from the positive electrode layer to the buffer layer can be controlled by, for example, performing oxygen annealing after the positive electrode layer and the buffer layer described below are deposited.

Furthermore, specifying the surface roughness Ra of the positive electrode layer is also preferable. When the surface of the positive electrode layer is smoothened, in forming the buffer layer described below on the positive electrode layer, a buffer layer having a sufficient and uniform thickness for suppressing the formation of the depletion layer, which is the main function of the buffer layer, can be formed. On the other hand, when the surface of the positive electrode layer is rough, the thickness of the buffer layer becomes locally large or small. Consequently, variations in the performance of the lithium battery may occur. Specifically, the surface roughness Ra of the positive electrode layer is preferably in the range of 1 to 40 nm. A more preferable lower limit of Ra is 6 nm, and a more preferable upper limit thereof is 25 nm. When the positive electrode layer is formed by using a sputtering method or a laser ablation method rather than an evaporation method, the surface roughness can be decreased. As a specific deposition condition, the pressure of the atmosphere during deposition is preferably in the range of 0.01 to 1 Pa, and more preferably, in the range of 0.1 to 0.5 Pa.

The positive electrode layer may further contain a conduction aid. Examples of the conduction aid include carbon black such as acetylene black, natural graphite, thermally expandable graphite, carbon fiber, ruthenium oxide, titanium oxide, and a metal fiber made of aluminum, nickel, or the like. In particular, carbon black is preferable because a high conductivity can be ensured by a small amount of addition thereof.

As a method of forming the positive electrode layer 13, a vapor-phase deposition method such as a PVD method or a CVD method can be employed. For example, an evaporation method, an ion-plating method, a sputtering method, or a laser ablation method can be employed. Unlike the lithium battery disclosed in Ref. 1, the lithium battery of the present invention is not produced using a method in which a positive electrode layer is formed by binding a powdery active material, e.g., an application method. Accordingly, even when the positive electrode layer contains a positive electrode active material in an amount that can be used for various applications, the thickness of the positive electrode layer can be reduced because the positive electrode layer contains no binding agent.

(Negative Electrode Collector Layer)

The negative electrode collector layer 12 is a metal film formed on the negative electrode layer 14. As the negative electrode collector layer 12, one type of metal selected from copper (Cu), nickel (Ni), iron (Fe), chromium (Cr), and an alloy thereof can be preferably used. The negative electrode collector layer 12 can also be formed by a PVD method or a CVD method as in the positive electrode collector layer 11.

(Negative Electrode Layer)

The negative electrode layer 14 is composed of a layer containing an active material occluding and releasing lithium ions. For example, as the negative electrode layer 14, one selected from the group consisting of lithium (Li) metal and a metal capable of forming an alloy with Li metal, a mixture thereof, or an alloy thereof can be preferably used. As the metal capable of forming an alloy with Li (hereinafter referred to as "alloying material"), at least one selected from the group consisting of aluminum (Al), silicon (Si), tin (Sn), bismuth (Bi), and indium (In) is preferable.

The negative electrode layer containing the above-mentioned element is preferable because the negative electrode layer may have a function as a collector by itself and its capacity of occluding and releasing lithium ions is high. In particular, silicon (Si) has a capacity of occluding and releasing lithium ions higher than that of graphite (black lead) and can increase the energy density of the battery.

In addition, the use of an alloy phase with Li metal as the negative electrode layer is advantageous in that the migration resistance of Li ions at an interface between an alloying material alloyed with Li metal and a Li-ion conductive solid electrolyte layer can be decreased, and an increase in the resistance of the alloying material in the initial charging of a first cycle can be suppressed.

Furthermore, when a metal element of an alloying material is used as the negative electrode layer, a problem that a discharge capacity is significantly decreased compared with a charge capacity occurs in the first charge-discharge cycle. However, by using a negative electrode layer material prepared by alloying Li metal with an alloying material, this irreversible capacity can be substantially eliminated. Accordingly, it is not necessary to fill an additional amount of a positive electrode active material corresponding to the irreversible capacity, and the capacity density of the lithium battery can be improved.

The above-described negative electrode layer 14 is preferably formed by a vapor-phase deposition method. Alternatively, the negative electrode layer may be formed by disposing a metal foil on an SE layer so as to overlap with each other, and allowing the metal foil to closely contact the SE layer by pressing or an electrochemical method.

(Solid Electrolyte Layer)

The solid electrolyte layer (SE layer) 15 is a Li-ion conductor composed of a sulfide. The SE layer 15 preferably has a Li ion conductivity (20° C.) of $10^{-5}$ S/cm or more and a Li ion transport number of 0.999 or more. In particular, the Li ion conductivity is preferably $10^{-4}$ S/cm or more and the Li ion transport number is preferably 0.9999 or more. In additions the SE layer 15 preferably has an electronic conductivity of $10^{-8}$ S/cm or less. The SE layer 15 is preferably composed of an amorphous film, a polycrystalline film, or the like composed of a sulfide, for example, Li—P—S—O made of Li, P, S, and O or Li—P—S made of $Li_2S$ and $P_2S_5$. In particular, when the SE layer is composed of Li—P—S made of $Li_2S$ and $P_2S_5$, the interface resistance between the SE layer and a negative active material layer can be decreased. As a result, the performance of the battery can be improved.

As a method of forming the SE layer 15, a solid-phase method or a vapor-phase deposition method can be employed. An example of the solid-phase method is a method including preparing a base powder using a mechanical milling method and then baking the base powder. Examples of the vapor-phase deposition method include PVD methods and CVD methods. Specific examples of the PVD methods include a vacuum evaporation method, a sputtering method, an ion-plating method, and a laser ablation method. Specific examples of the CVD methods include a thermal CVD method and a plasma CVD method. In the case where the SE layer is formed by a vapor-phase deposition method, the thickness of the SE layer can be decreased as compared with the case where the SE layer is formed by a solid-phase deposition method.

(Buffer Layer)

The buffer layer 16 is a layer that prevents lithium ions from migrating in a large amount from the SE layer 15 to the positive electrode layer 13 to suppress nonuniformity of distribution of electric charges at the interface between the SE layer 15 and the positive electrode layer 13, thereby preventing a depletion layer from being formed on the SE layer 15 near the interface. The buffer layer 16 is preferably made of an oxide. Specific examples of the oxide include $Li_xLa_{(2-x)/3}TiO_3$ (x=0.1 to 0.5), $Li_{7+x}La_3Zr_2O_{12+(x/2)}$ ($-5 \leq x \leq 3$, preferably $-2 \leq x \leq 2$), $Li_4Ti_5O_{12}$, $Li_{3.6}Si_{0.6}P_{0.4}O_4$, $Li_{1.3}Al_{0.3}Ti_{1.7}(PO_4)_3$, $Li_{1.8}Cr_{0.8}Ti_{1.2}(PO_4)_3$, $LiNbO_3$, $LiTaO_3$, and $Li_{1.4}In_{0.4}Ti_{1.6}(PO_4)_3$. These compounds may be used alone or in combinations. When some of these compounds, for example, $Li_xLa_{(2-x)/3}TiO_3$, $LiNbO_3$, and $LiTaO_3$ are in an amorphous state, the lithium conductivity can be improved. Among the above-mentioned oxides, $Li_xLa_{(2-x)/3}TiO_3$ (x=0.1 to 0.5) has an excellent lithium-ion conductivity of $10^{-1}$ S/cm or more in both a crystallized state and an amorphous state. Therefore, when this compound is used as the buffer layer 16, the performance of a battery can be improved. In addition, $LiNbO_3$ also has an excellent lithium-ion conductivity of $10^{-1}$ S/cm or more in an amorphous state. An indicator showing that $LiNbO_3$ is in an amorphous state is that, in X-ray diffractometry, no peak having a fall width at half maximum of 5° or less is present in the range of 22° to 25° of 2θ. When the buffer layer is formed at a temperature at which the above-mentioned compound has a crystalline structure, the compound constituting the buffer layer excessively diffuses into the positive electrode layer, and the buffer layer may become brittle.

Preferably, a part of the compound constituting the buffer layer that is in contact with the positive electrode layer has diffused into the positive electrode layer. By controlling the degree of diffusion of the above-mentioned compound to the positive electrode layer, the formation of a depletion layer can be suppressed, and in addition, the adhesiveness between the positive electrode layer and the buffer layer can be improved. For example, in the case where the buffer layer contains $LiNbO_3$, the concentration of Nb diffused from the buffer layer at a position in the positive electrode layer 25 nm from the interface with the buffer layer is controlled to be $1 \times 10^{-3}$ atomic percent or more and 25 atomic percent or less. The Nb concentration can be measured by, for example, secondary ion mass spectrometry (SIMS). Note that, in the case where the positive electrode layer is made of $LiCoO_2$, the Nb concentration is represented by the proportion of the amounts of atoms, i.e., Nb/(Nb+O+Li+Co), at a measuring point.

In addition, the thickness of the buffer layer is preferably 1 μm or less. An excessively large thickness of the buffer layer makes it difficult to reduce the thickness of a lithium battery. In order to suppress the formation of a depletion layer, a thickness of 2 nm or more is sufficient. Therefore, this value is determined as the lower limit. In order to more reliably suppress the formation of a depletion layer, the thickness of the buffer layer should be 5 nm or more.

Furthermore, the electronic conductivity of the buffer layer is preferably $1 \times 10^{-5}$ S/cm or less. By specifying the electronic conductivity as described above, polarization in the buffer layer can be suppressed, and thus, the formation of a depletion layer can be suppressed. The use of the above-mentioned compound can provide a buffer layer that substantially satisfies the above electronic conductivity.

Furthermore, the density d (g/cm$^3$) of the buffer layer is preferably 92% or more of the theoretical density. For example, since the theoretical density of $LiNbO_3$ is 4.64 g/cm$^3$, the density d of the buffer layer is about 4.27 g/cm$^3$ (92%) or more, more preferably 4.32 g/cm$^3$ (about 93%) or more, and further preferably 4.36 g/cm$^3$ (about 94%) or more. Since the theoretical density of $LiTaO_3$ is 7.46 g/cm$^3$, the buffer layer preferably has a density of at least 6.86 g/cm$^3$ or more (92% or more of the theoretical density). If the density d of the buffer layer is less than 90% of the theoretical density, the effect of suppressing nonuniformity of distribution of electric charges in the solid electrolyte layer is decreased.

This buffering layer can be formed by a vapor-phase deposition method such as a PVD method or a CVD method. Note that, by controlling the temperature or the pressure of the atmosphere during vapor-phase deposition, the density of the buffer layer can be changed or the crystal structure of the buffer layer can be changed.

<<Method of Producing Lithium Battery>>

To produce a lithium battery, on the positive electrode collector layer 11, which also functions as a substrate for supporting layers, the positive electrode layer 13, the buffer layer 16, the SE layer 15, the negative electrode layer 14, and the negative electrode collector layer 12 are laminated in that order. Alternatively, a laminate composed of the positive electrode collector layer 11, the positive electrode layer 13, the buffer layer 16, and the SE layer 15 is prepared, and another laminate composed of the negative electrode collector layer 12 and the negative electrode layer 14 is separately prepared. These two laminates may then be stacked to produce the lithium battery 1.

In stacking the above-mentioned two laminates, a solution composed of a ionic liquid containing a lithium-containing salt may be applied on the contact surface between the laminates. As this solution, a solution having a high lithium-ion conductivity (preferably $10^{-4}$ S/cm or more) and a low electronic conductivity (preferably $10^{-8}$ S/cm or less) is used. This solution has very low electronic conductivity and has excellent ion conductivity. Therefore, even if a pin hole is formed in the SE layer 15, short-circuit between the positive electrode and the negative electrode can be prevented.

Advantages of First Embodiment

Only by providing the buffer layer 16 between the positive electrode layer 13 and the SE layer 15, the lithium battery 1 having the above-described structure can suppresses nonuniformity of distribution of lithium ions near the interface between the positive electrode layer 13 and the SE layer 15 and suppress the formation of a depletion layer in the SE layer 15. In addition, the buffer layer 16 can be formed by only laminating on the positive electrode layer 13. Accordingly, the lithium battery can be produced very simply and efficiently.

Second Embodiment Partially Laminated Structure

<<Overall Structure>>

Figure 2:
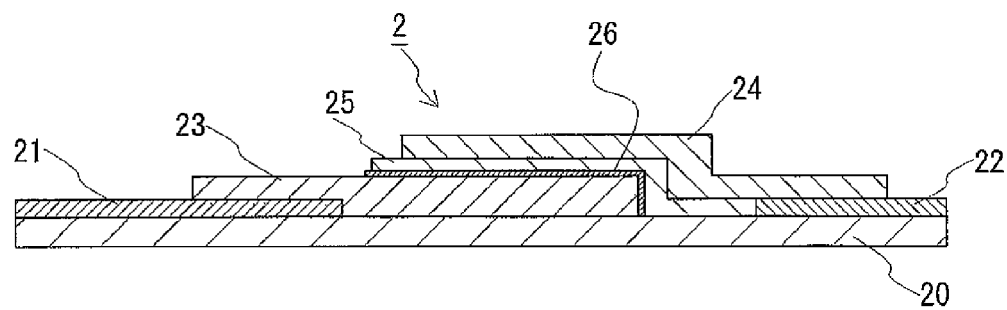
FIG. 2 is a longitudinal cross-sectional view of a lithium battery according to a second embodiment of the present invention.

FIG. 2 is a longitudinal cross-sectional view of a lithium battery of this embodiment. A battery 2 includes a positive electrode collector layer 21, a negative electrode collector layer 22, a positive electrode layer 23, a negative electrode layer 24, an SE layer 25, and a buffer layer 26, all of which are provided on an insulating substrate 20. The same materials and the same formation methods as those used in the first embodiment can be used for forming the layers 21 to 26. As shown in FIG. 2, the layers 21 to 26 of this lithium battery 2 are arranged in a staircase pattern. The specific arrangement state of the layers will now be described from the substrate in order with reference to the drawing.

<<Constitutional Components>>

(Substrate)

In this embodiment, unlike the first embodiment, the substrate 20 having insulating property and heat resistance was prepared separately from a positive electrode collector, and the layers are provided on this substrate 20. As the material of the insulating substrate 20, for example, a ceramic such as $SrTiO_3$, MgO, or $SiO_2$ can be used. Such a ceramic has heat resistance sufficient to withstand temperatures during the formation of the positive electrode layer by a vapor-phase deposition method.

(Positive Electrode Collector Layer and Negative Electrode Collector Layer)

Each of the positive electrode collector layer 21 and the negative electrode collector layer 22 is a thin film provided on the substrate 20 in parallel. A predetermined space is provided between the collector layers 21 and 22, and the collector layer 21 or 22 is not provided on the central portion of the substrate.

(Positive Electrode Layer)

The positive electrode layer 23 is provided so as to cover a part of the positive electrode collector layer 21 and a part of the substrate 20 not having the collector layer 21 or 22 thereon. In the positive electrode layer of this example, a part located on the collector layer 21 has a small thickness and a part located on the substrate 20 has a large thickness such that the top surface of the positive electrode layer 23 is flat.

(SE Layer)

The SE layer 25 is provided so as to cover a part of the positive electrode layer 23 located on the substrate 20 and a part of the substrate 20 on which the collector layers 21 and 22 and the positive electrode layer 23 are not provided. The SE layer 25 of this example is formed so as to have a staircase pattern at the part of the positive electrode layer.

(Buffer Layer)

The buffer layer 26 is provided so as to cover the top surface and a part of side surfaces of the positive electrode layer 23 such that the SE layer 25 and the positive electrode layer 23 do not directly contact each other. The buffer layer 26 of this example has a uniform thickness.

(Negative Electrode Layer)

The negative electrode layer 24 is provided so as to cover a part of the SE layer 25 and a part of the negative electrode collector layer 22. The negative electrode layer 24 has a uniform thickness. A part of the negative electrode layer 24 is disposed on the upper step portion of the SE layer 25 and another part of the negative electrode layer 24 is disposed on the lower step portion of the electrolyte layer 25 and on the negative electrode collector layer 22. That is, when the battery 2 is viewed in the thickness direction, a part of the positive electrode layers 23 and a part of the negative electrode layer 24 are disposed so as to overlap with each other.

By forming the layers 21 to 26 so as to partly overlap with each other as described above, the layers 21 to 26 are arranged in a staircase pattern, as shown in FIG. 2. The number of layers at the position where the maximum number of layers overlap (the position where the positive electrode layer 23, the buffer layer 26, the electrolyte layer 25, and the negative electrode layer 24 are laminated) is smaller than the number of layers in the case where all the layers 21 to 26 are stacked. In this example, as regards the layer 21 to the layer 26, the maximum number of layers is four, and specifically, the four layers are the positive electrode layer 23, the buffer layer 26, the electrolyte layer 25, and the negative electrode layer 24. Exposed portions of the collector layers 21 and 22 on which the positive electrode layer 23 or the negative electrode layer 24 is not provided can be used as lead portions for receiving and supplying electric power from/to the outside.

In the structure of this example, the two collector layers are in contact with the substrate. Alternatively, the negative electrode collector layer may be provided at the lower position of the staircase pattern (the lower step portion) of the top surface of the negative electrode layer. In addition, in the structure of this example, the battery includes collector layers for each of the electrodes. However, in the case where the electrode layers are made of an alloy or the like and each of the electrode layers has a function as a collector by itself, collector layers need not be provided. Therefore, the number of layers to be laminated can be further decreased.

Advantages of Second Embodiment

The battery 2 of this embodiment is a thin lithium battery having a high capacity and for which excellent productivity can be achieved, as in the battery of the first embodiment. Furthermore, as described above, the battery 2 does not have a structure in which all layers overlap with each other but has a structure in which layers partly overlap with each other, and thus, the battery 2 has relatively small dimensions. Consequently, the battery 2 can have a thickness smaller than that of the battery of the first embodiment.

Third Embodiment Non-Laminated Structure

<<Overall Structure>>

Figure 3:
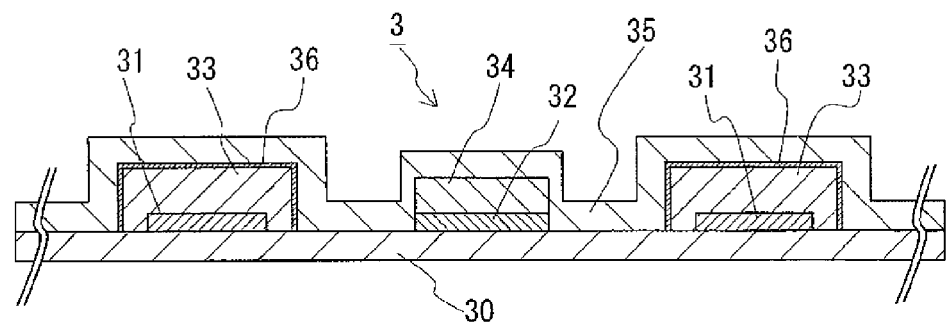
FIG. 3 is a longitudinal cross-sectional view of a lithium battery according to a third embodiment of the present invention.

FIG. 3 is a longitudinal cross-sectional view of a battery according to an embodiment of the present invention different from the batteries of the first and second embodiments. A lithium battery 3 is includes a positive electrode collector layer 31, a positive electrode layer 33, a negative electrode collector layer 32, a negative electrode layer 34, a solid electrolyte layer 35, and a buffer layer 36, all of which are provided on a substrate 30 having an insulating property and heat resistance. The same materials and the same formation methods as those used in the first embodiment can be used for forming the layers 31 to 36. The point of difference lies in the shape of each of the layers. When the battery 3 is viewed from the thickness direction, the entire part of the positive electrode layer 33 and the entire part of the negative electrode layer 34 of the battery 3 are arranged so as not to overlap with each other. The SE layer 35 is arranged so as to cover the entire part of the electrode layers 33 and 34. The arrangement state and the shape of each of the layers will now be described in detail.

<<Constitutional Components>>

(Positive Electrode Collector Layer and Negative Electrode Collector Layer)

Each of the positive electrode collector layer 31 and the negative electrode collector layer 32 has a comb-tooth shape having a linear lead portion (not shown) and a plurality of branched portions (not shown) in plan view. The collectors 31 and 32 are provided directly on the substrate 30 such that the branched portions of the negative electrode collector layer 32 are arranged between adjacent branched portions of the positive electrode collector layer 31, i.e., such that comb teeth of the collectors 31 and 32 are alternately arranged. That is, FIG. 3 is a cross-sectional view showing a portion where the comb teeth are alternately arranged.

(Positive Electrode Layer and Negative Electrode Layer)

The positive electrode layer 33 is provided on each of the branched portions of the positive electrode collector layer 31. Similarly, the negative electrode layer 34 is provided on each of the branched portions of the negative electrode collector layer 32. Since the electrode layers 33 and 34 are provided on the branched portions, the positive electrode layer 33 and the negative electrode layer 34 are substantially disposed on the same plane. In this embodiment, the positive electrode layer 33 is provided so as to cover the top surface and the side surfaces of the collector 31, whereas the negative electrode layer 34 is provided so as to cover only the top surface of the collector 32. Alternatively, the negative electrode layer 34 may be formed such that the side surfaces of the collector 32 are also covered with the negative electrode layer 34. When the negative electrode layer 34 is formed so as to cover the side surfaces of the collector 32, the contact area between the collector 32 and the negative electrode layer 34 can be increased, and the generation of dendrite on the side surfaces of the collector 32 can be suppressed.

(Buffer Layer and SE Layer)

The buffer layer 36 is provided so as to cover the outer surface of the positive electrode layer 33. Furthermore, the SE layer 35 is provided so as to cover the outer surfaces of the buffer layer 36 and the negative electrode layer 34, and exposed portions of the substrate 30 not having the electrode layer 33 or 34 thereon. By arranging the SE layer 35 and the buffer layer 36 in this manner, supply and receiving of ions can be performed between the electrode layers 33 and 34 through the SE layer 35 and the buffer layer 36. In addition, in the structure of this embodiment, since the SE layer 35 is not directly in contact with the positive electrode layer 33, a decrease in the performance of the battery 3 due to the formation of a depletion layer in the SE layer 35 can also be prevented.

In an example of another structure including comb-tooth-shaped collectors, both electrode layers of a lithium battery may not be arranged on the same plane of the SE layer. Specifically, a comb-tooth-shaped positive electrode collector layer, a positive electrode layer, and a buffer layer covering the positive electrode layer are formed on a substrate, and an SE layer is formed so as to cover the entire part of these layers. Subsequently, a negative electrode layer is formed on the SE layer such that the negative electrode layer does not overlap with the positive electrode layer in the thickness direction when the SE layer is viewed in plan view. That is, when the battery is viewed in plan view, the positive electrode layer and the negative electrode layer are arranged such that the comb teeth of the electrode layers are alternately disposed, and the two electrode layers are not arranged on the same plane of the SE layer. Accordingly, even if a conductive foreign substance is present on the substrate, short-circuit between the electrode layers due to interfacial conductance through this foreign substance can be prevented. Note that, regarding the positional relationship between the two electrode layers, the negative electrode layer may be provided so as to be adjacent to the substrate.

Advantages of Third Embodiment

The battery 3 of this embodiment is a thin lithium battery having a high capacity and for which excellent productivity can be achieved, as in the batteries of the first and second embodiments. In addition, the electrode layers 33 and 34 of the battery 3 are arranged so as not to overlap with each other in the thickness direction. Accordingly, even if a pin hole is formed in the electrolyte layer 35, the electrode layers 33 and 34 are not short-circuited.

Example 1

Coin cell lithium batteries (Samples 1 to 3 and Samples 101 to 103) having the structure described in the first embodiment were prepared. The performance of each of the batteries was evaluated by measuring the capacity thereof.
<Sample 1>
A thin SUS 316L sheet having a thickness of 50 µm was prepared as a positive electrode collector layer 11. This thin sheet also functions as a substrate for supporting layers.

A positive electrode layer 13 is formed on the positive electrode collector layer 11 by depositing $LiCoO_2$ at a substrate temperature of 600° C. by an electron-beam evaporation method. The thickness of the positive electrode layer 13 was 10 µm.

A buffer layer 16 was formed on the positive electrode layer 13 by depositing $Li_{0.35}La_{0.55}TiO_3$ by an excimer laser ablation method. The thickness of the buffer layer 16 was 10 nm. The lithium ion conductivity of the buffer layer was $5 \times 10^{-4}$ S/cm, and the electronic conductivity thereof was $1 \times 10^{-8}$ S/cm.

An SE layer 15 having a Li—P—S composition was formed on the buffer layer 16 by an excimer laser ablation method. In forming the SE layer 15, lithium sulfide ($Li_2S$) and phosphorus pentasulfide ($P2S_5$) were used as raw materials and the molar ratio Li/P in the SE layer 15 was controlled to be 2.0. The thickness of the SE layer 15 was 10 µm.

A negative electrode layer 14 was formed on the SE layer 15 by depositing Li by a resistance-heating evaporation method. The thickness of the negative electrode layer 14 was 5 µm.

A negative electrode collector layer 12 was formed on the negative electrode layer 14 by depositing Ni by an electron-beam evaporation method. The thickness of the negative electrode collector layer 12 was 0.2 µm.

Finally, the outer surfaces of the resulting laminate were covered with an outer packaging material to produce a lithium battery. The lithium battery has a structure in which terminals are provided from the collectors.
<Sample 2>
For Sample 2, a lithium battery including a positive electrode layer whose composition was different from that of the lithium battery of Sample 1 was prepared. Specifically, the positive electrode layer was formed using MnO2 as a positive electrode active material, and the thickness of the positive electrode layer was 10 µm. The compositions and the thicknesses of the layers other than the positive electrode layer, the methods of forming the other layers, and other conditions were the same as those used for Sample 1.
<Sample 3>
For Sample 3, a lithium battery including a positive electrode layer whose composition was different from the compositions of the positive electrode layers of the lithium batteries of Samples 1 and 2 was prepared. Specifically, the positive electrode layer was formed using $LiMnO_2$ as a positive electrode active material, and the thickness of the positive electrode layer was 10 µm. The compositions and the thicknesses of the layers other than the positive electrode layer, the methods of forming the other layers, and other conditions were the same as those used for Sample 1.
<Samples 101 to 103>
For Samples 101 to 103, conventional lithium batteries not having a buffer layer were prepared. Sample 101 is the same as the battery of Sample 1 except that a buffer layer is not provided. Samples 102 and 103 are the same as Samples 2 and 3, respectively, except that a buffer layer is not provided.

The performance of the batteries was evaluated by measuring the capacities of the lithium batteries of Samples 1 to 3 and Samples 101 to 103 described above. The measurement results are shown in Table I. The thickness of each layer can be determined by inductively coupled plasma emission spectroscopy.

TABLE I

| Sample | Positive electrode collector layer | Positive electrode layer | Buffer layer | SE layer | Negative electrode layer | Negative electrode collector layer | Discharge capacity (mAh) |
| --- | --- | --- | --- | --- | --- | --- | --- |
| Sample 1 | SUS316L | $LiCoO_2$ | $Li_{0.35}La_{0.55}TiO_3$ | $Li_2S + P_2S_5$ | Li metal | Ni foil | 120 |
| Sample 2 | SUS316L | $MnO_2$ | $Li_{0.35}La_{0.55}TiO_3$ | $Li_2S + P_2S_5$ | Li metal | Ni foil | 280 |
| Sample 3 | SUS316L | $LiMnO_2$ | $Li_{0.35}La_{0.55}TiO_3$ | $Li_2S + P_2S_5$ | Li metal | Ni foil | 90 |
| Sample 101 | SUS316L | $LiCoO_2$ | Not formed | $Li_2S + P_2S_5$ | Li metal | Ni foil | 50 |

TABLE I-continued

| Sample | Positive electrode collector layer | Positive electrode layer | Buffer layer | SE layer | Negative electrode layer | Negative electrode collector layer | Discharge capacity (mAh) |
|---|---|---|---|---|---|---|---|
| Sample 102 | SUS316L | $MnO_2$ | Not formed | $Li_2S + P_2S_5$ | Li metal | Ni foil | 60 |
| Sample 103 | SUS316L | $LiMnO_2$ | Not formed | $Li_2S + P_2S_5$ | Li metal | Ni foil | 30 |

Positive electrode collector layer *** 50 μm
Positive electrode layer *** 10 μm
Buffer layer *** 10 nm
SE layer *** 10 μm
Negative electrode layer *** 5 μm
Negative electrode collector layer *** 0.2 μm As is apparent from the comparison of Samples 1 to 3 with Samples 101 to 103, the capacities of the lithium batteries having a buffer layer (the batteries of Samples 1 to 3) were higher than those of the conventional batteries (the batteries of Samples 101 to 103). The difference between the batteries of the present invention and the conventional batteries is the presence or absence of the buffer layer. Accordingly, it became clear that the buffer layer suppressed the formation of a depletion layer in an SE layer, and consequently, a high capacity of a battery could be realized.

Example 2

Lithium batteries (Samples A to C) in which the compound constituting the buffer layer was changed to a compound ($Li_{7+x}La_3Zr_2O_{12+(x/2)}$; $-5 \leq x \leq 3$) different from that of Example 1 were prepared. The buffer layer was formed by an excimer laser ablation method as in Example 1. A lithium battery (Sample Z) not having a buffer layer was also prepared. The total resistances and the capacities of Samples A to C and Sample Z were compared to each other. The structures of the layers and measurement results of the batteries are summarized in Table II. Note that the term "total resistance" represents the internal resistance ($\Omega cm^2$) of the battery when the battery was charged at 4.0 V.

Example 3

Next, effects of "the crystal state of the positive electrode layer", "the crystal state of the buffer layer", "the diffusion state of a compound constituting the buffer layer to the positive electrode layer", "the diffusion of an element contained in the positive electrode layer to the buffer layer", "the density of the buffer layer", and "the surface roughness Ra of the positive electrode layer" on the performances of batteries were evaluated. Specifically, coin cell batteries (Sample 4 and Samples 104 to 110) were prepared by changing the structures of the layers of the lithium battery described in Example 1. The performance of each of the batteries was evaluated by measuring the capacity thereof.

<Sample 4>

The material of the negative electrode collector was changed to SUS 316L, and the material of the buffer layer was changed to $LiNbO_3$, as compared with the battery of Sample 1. Each of the layers was formed in accordance with the methods used in Example 1. However, in forming the positive electrode layer and the buffer layer, the deposition conditions in the excimer laser ablation method were controlled as

TABLE II

| Sample | Positive electrode collector layer | Positive electrode layer | Buffer layer | SE layer | Negative electrode layer | Negative electrode collector layer | Total resistance of battery ($\Omega cm^2$): At 4 V | Discharge capacity (mAh) |
|---|---|---|---|---|---|---|---|---|
| Sample A | SUS316L | $LiCoO_2$ | $Li_7La_3Zr_2O_{12}$ | $Li_2S + P_2S_5$ | Li metal | SUS316L | 150 | 140 |
| Sample B | SUS316L | $LiCoO_2$ | $Li_3La_3Zr_2O_{10}$ | $Li_2S + P_2S_5$ | Li metal | SUS316L | 240 | 120 |
| Sample C | SUS316L | $LiCoO_2$ | $Li_{10}La_3Zr_2O_{13.5}$ | $Li_2S + P_2S_5$ | Li metal | SUS316L | 210 | 120 |
| Sample Z | SUS316L | $LiCoO_2$ | Not formed | $Li_2S + P_2S_5$ | Li metal | SUS316L | 80k | 30 |

Positive electrode collector layer *** 0.5 mm
Positive electrode layer *** 0.5 μm
Buffer layer *** 20 nm
SE layer *** 3 μm; Molar ratio of Li/P was 2.0.
Negative electrode layer *** 0.5 μm
Negative electrode collector layer *** 0.5 mm Referring to the results shown in Table II, the batteries of Samples A to C in which the compound constituting the buffer layer was changed to a compound represented by $Li_{7+x}La_3Zr_2O_{12+(x/2)}$ ($-5 \leq x \leq 3$) had total resistances markedly lower than the total resistance of Sample Z, which did not include a buffer layer. Therefore, Samples A to C also had capacities comparable to those of Samples 1 to 3 of Example 1. In particular, Sample A having a buffer layer made of $Li_7La_3Zr_2O_{12}$ had the lowest total resistance and the largest capacity. In addition, in XRD observation of the buffer layers made of $Li_{7+x}La_3Zr_2O_{12+(x/2)}$ ($-5 \leq x \leq 3$), no distinct peak was observed. Accordingly, it was confirmed that these buffer layers were in an amorphous state.

described below. By depositing the positive electrode layer under the above conditions, the surface roughness Ra of the positive electrode layer was controlled to be 14 nm, the $LiNbO_3$ constituting the buffer layer was controlled to be in an amorphous state, and the density ($g/cm^3$) of the buffer layer was controlled to be 4.30 (about 92.7% of tie theoretical density) or more. Furthermore, after the buffer layer was deposited by excimer laser ablation, oxygen annealing was performed in an air atmosphere furnace at 400° C. for 0.5 hours. Thereby, the compound constituting the buffer layer was diffused into the positive electrode layer, and the transition metal element contained in the positive electrode layer was diffused into the buffer layer at the same time.

[Deposition Condition for Positive Electrode Layer]
 The degree of vacuum during deposition of $LiCoO_2$: 0.2 Pa
 Deposition atmosphere: Oxygen
 Deposition temperature: Room temperature
 Laser energy: 0.32 V (2.5 $J/cm^2$)
 Annealing after deposition: 500° C.×3 h
[Deposition Condition for Buffer Layer]
 The degree of vacuum during deposition of $LiNbO_3$: 1 Pa
 Deposition atmosphere: Oxygen
 Deposition temperature: Room temperature
 Laser energy: 0.3 V (2.3 $J/cm^2$)
 Annealing after deposition: 450° C.×0.5 h
<Samples 104 to 110>
 Samples 104 to 110 having the same structure as Sample 4 except for points described below were prepared as in Sample 4. The points that were changed described below can be achieved by controlling the temperature or other conditions during the formation of each layer.
 Sample 104: The buffer layer was not deposited.

crystallized, the compound constituting the buffer layer easily diffuses into the positive electrode layer during the deposition process.
 Sample 108: The density ($g/cm^3$) of the buffer layer was controlled to be lower than the density of Sample 4 by controlling the pressure of the atmosphere during the deposition of the buffer layer to be 10 Pa.
 Sample 109: Annealing under the above condition was not performed after the deposition of the buffer layer in order to suppress the diffusion of the transition metal element (Co) contained in the positive electrode layer into the buffer layer.
 Sample 110: The surface roughness Ra of the positive electrode layer was controlled to be 45 nm by controlling the pressure of the atmosphere during the deposition of the positive electrode layer to be 10 Pa.
 The structures of the layers of Sample 4 and Samples 104 to 110 are summarized in Table III. The thickness of each layer can be determined by inductively coupled plasma emission spectroscopy.

TABLE III

| Sample | Positive electrode collector layer | Positive electrode layer | Buffer layer | SE layer | Negative electrode layer | Negative electrode collector layer |
| --- | --- | --- | --- | --- | --- | --- |
| Sample 4 | SUS316L | $LiCoO_2$ | $LiNbO_3$ | $Li_2S + P_2S_5$ | Li metal | SUS316L |
| Sample 104 | SUS316L | $LiCoO_2$ | Not formed | $Li_2S + P_2S_5$ | Li metal | SUS316L |
| Sample 105 | SUS316L | $LiCoO_2$ | $LiNbO_3$ | $Li_2S + P_2S_5$ | Li metal | SUS316L |
| Sample 106 | SUS316L | $LiCoO_2$ | $LiNbO_3$ | $Li_2S + P_2S_5$ | Li metal | SUS316L |
| Sample 107 | SUS316L | $LiCoO_2$ | $LiNbO_3$ | $Li_2S + P_2S_5$ | Li metal | SUS316L |
| Sample 108 | SUS316L | $LiCoO_2$ | $LiNbO_3$ | $Li_2S + P_2S_5$ | Li metal | SUS316L |
| Sample 109 | SUS316L | $LiCoO_2$ | $LiNbO_3$ | $Li_2S + P_2S_5$ | Li metal | SUS316L |
| Sample 110 | SUS316L | $LiCoO_2$ | $LiNbO_3$ | $Li_2S + P_2S_5$ | Li metal | SUS316L |

Positive electrode collector layer *** 0.5 mm
Positive electrode layer *** 0.5 μm (50 nm in Sample 105)
Buffer layer *** 20 nm
SE layer *** 3 μm; Molar ratio of Li/P was 2.0.
Negative electrode layer *** 0.5 μm
Negative electrode collector layer *** 0.5 mm Sample 105: The ratio (003)/(101) of plane indices of the positive electrode layer was controlled to exceed 10 by utilizing a tendency that the ab-axis orientation was lowered by reduction of the thickness of the positive electrode layer (specifically 50 nm).

Sample 106: Annealing was not performed in order to suppress the diffusion of the compound constituting the buffer layer into the positive electrode layer.

Sample 107: The buffer layer was deposited at a sample temperature of 500° C., thereby crystallizing the buffer layer. In the case where the buffer layer is deposited so as to be The performance of the batteries was evaluated by measuring the capacities at charge/discharge coefficients of 1C and 30C using the lithium batteries of Sample 4 and Samples 104 to 110 described above. The measurement results are shown in Table IV.

TABLE IV

| | Positive electrode layer | | | Buffer layer | | | | Capacity (mAh) | |
| --- | --- | --- | --- | --- | --- | --- | --- | --- | --- |
| Sample | XRD peak ratio | Occurrence or non-occurrence of diffusion | Surface roughness Ra (nm) | Presence or absence of XRD peak | Co/Li ratio at the interface with SE layer | Density d ($g/cm^3$) | Total resistance of battery ($\Omega cm^2$): At 4 V | 1 C discharge | 30 C discharge |
| Sample 4 | 1.2 | A | 14 | B | $1 \times 10^{-2}$ | 4.3 | 160 | 140 | 140 |
| Sample 104 | 1.2 | | 14 | | | | 80k | 20 | Not operate |
| Sample 105 | 12 | A | 14 | B | $1 \times 10^{-2}$ | 4.3 | 10k | 50 | Not operate |
| Sample 106 | 1.2 | B | 14 | B | $1 \times 10^{-4}$ | 4.3 | 8k | 60 | Not operate |
| Sample 107 | 1.2 | More than 25 at % | 14 | A | $7 \times 10^{-1}$ | 4.5 | 100k | 10 | Not operate |
| Sample 108 | 1.2 | A | 14 | B | $1 \times 10^{-2}$ | 4.2 | 800 | 80 | Not operate |
| Sample 109 | 1.2 | B | 14 | B | $1 \times 10^{-5}$ | 4.3 | 500 | 120 | 50 |
| Sample 110 | 1.2 | A | 45 | B | $1 \times 10^{-2}$ | 4.3 | 1k | 80 | Not operate |

The meanings of terms shown in Table IV are as follows.
 The term "X-ray diffraction (XRD) peak ratio" is an indicator indicating whether the ab-axis orientation is dominant over the c-axis orientation in the positive electrode layer and is represented by the ratio (003)/(101) of the (003) plane to the (101) plane of the positive electrode layer determined by X-ray diffractometry.

The term "occurrence or non-occurrence of diffusion" is an indicator indicating whether $LiNbO_3$ constituting the buffer layer has diffused into the positive electrode layer. When the Nb concentration at a position in the positive electrode layer 25 nm from the interface between the positive electrode layer and the buffer layer in the thickness direction was $1 \times 10^{-3}$ atomic percent or more (when the diffusion was sufficient), the battery was evaluated as "A". When the Nb concentration was less than $1 \times 10^{-3}$ atomic percent (when the diffusion was insufficient), the battery was evaluated as "B". The Nb concentration in the positive electrode layer was measured by secondary ion mass spectrometry (SIMS).

The term "surface roughness Ra" represents the surface roughness of the positive electrode layer at the side adjacent to the buffer layer. The surface roughness of the positive electrode layer was measured using an atomic force microscope (AFM).

The term "presence or absence of XRD peak" is an indicator indicating whether the buffer layer was in an amorphous state and represents whether a peak having a full width at half maximum of 5° or less was observed in the range of 22° to 25° of 2θ in XRD observation of the buffer layer. When such a peak was observed (when the buffer layer had a crystalline structure), the battery was evaluated as "A". When such a peak was not observed (when the buffer layer was in an amorphous state), the battery was evaluated as "B".

The term "Co/Li ratio at the interface with SE layer" represents the mass ratio (Co/Li) of Co to Li in the buffer layer at the interface with the SE layer and is an indicator indicating whether Co (transition metal element) contained in the active material of the positive electrode layer has diffused into the buffer layer. The ratio Co/Li was analyzed by SIMS.

The term "density d" represents the density of the buffer layer. In this Example, $LiNbO_3$ was used as the buffer layer, and therefore, the theoretical density d of the buffer layer is 4.64. The density was measured by X-ray reflectometry (XRR).

The term "total resistance" represents the internal resistance ($\Omega cm^2$) of the battery when the battery was charged at 4.0 V.

As shown in Table IV, Sample 4, which had an XRD peak ratio for the positive electrode layer of 1.2, in which the buffer layer was in an amorphous state, and in which $LiNbO_3$ constituting the buffer layer had diffused into the positive electrode layer, had a capacity of 140 mAh at discharges of 1C and 30C.

For Sample 104, which did not include a buffer layer, the total resistance of the battery was higher than that of Sample 4. It is believed that, since the buffer layer was not provided, a depletion layer was formed in the positive electrode layer, resulting in an increase in the total resistance of the battery. Since the battery of Sample 104 had a high total resistance, Sample 104 had a very low capacity at 1C and did not operate at 30C.

For Sample 105, in which the XRD peak ratio in the positive electrode layer was more than 10, it is believed that since the lithium-ion conductivity in the positive electrode layer was lower than that of Sample 4, the total resistance of Sample 105 was also increased. As a result, Sample 105 had a very low capacity at 1C and did not operate at 30C.

For Sample 106, in which the diffusion of $LiNbO_3$ constituting the buffer layer in the positive electrode layer was insufficient, the total resistance of the battery was higher than that of Sample 4. As a result, Sample 106 had a very low capacity at 1C and did not operate at 30C.

For Sample 107, in which $LiNbO_3$ constituting the buffer layer had a crystalline structure, the total resistance of the battery was higher than that of Sample 4. The reason for this is believed to be as follows. Since $LiNbO_3$ had a crystalline structure, $LiNbO_3$ constituting the buffer layer had excessively diffused into the positive electrode layer, thereby increasing the thickness of a diffusion area where the compound of the buffer layer was mixed with the compound of the positive electrode layer. Consequently, the total resistance of the battery was also increased by the presence of this diffusion area. Because of the high total resistance, Sample 107 had a very low capacity at 1C and did not operate at 30C.

For Sample 108, in which the density d of the buffer layer was less than 4.30, it became clear that the total resistance of the battery was low and the capacity at 1C was high, compared with Samples 104 to 107, but the battery performance was inferior to that of Sample 4. In addition, the battery of Sample 108 did not operate at 30C.

It became clear that Sample 109, in which the diffusion of Co contained in the positive electrode layer in the buffer layer was insufficient, operated at 30C unlike the other samples, but the battery performance was inferior to that of Sample 4.

It became clear that Sample 110, which includes a positive electrode layer having a large surface roughness, had a battery performance inferior to that of Sample 4. This is because since the surface of the positive electrode layer is rough, some of the areas of the positive electrode layer cannot be covered with the buffer layer formed thereon.

On the basis of the above results, it was confirmed that "the crystal state of the positive electrode layer", "the crystal state of the buffer layer", "the diffusion state of a compound constituting the buffer layer to the positive electrode layer", "the diffusion state of an element contained in the positive electrode layer to the buffer layer", "the density of the buffer layer", and "the surface roughness Ra of the positive electrode layer" affected the performances of batteries.

The embodiments described above can be appropriately changed without departing from the gist of the present invention. Specifically, regarding the arrangement of a positive electrode layer, a solid electrolyte layer, and a negative electrode layer, all of which constitute a lithium battery, arrangements other than those described in the above embodiments may be used. In any arrangement, it is sufficient that a buffer layer is provided between the positive electrode layer and the solid electrolyte layer such that these two layers do not directly contact each other.

The lithium battery of the present invention can be suitably used as a power supply of, for example, portable devices.

What is claimed is:

1. A lithium battery comprising:
    a substrate;
    a positive electrode layer;
    a negative electrode layer; and
    a sulfide solid electrolyte layer that mediates conduction of lithium ions between the positive electrode layer and the negative electrode layer,
    wherein the positive electrode layer, the negative electrode layer, and the sulfide solid electrolyte layer are provided on the substrate,
    wherein the positive electrode layer is formed by a vapor-phase deposition method,
    wherein a buffer layer that suppresses nonuniformity of distribution of lithium ions near the interface between the positive electrode layer and the solid electrolyte layer is provided between the positive electrode layer and the solid electrolyte layer, wherein the buffer layer is in an amorphous state,
    wherein an ab-axis orientation is higher than a c-axis orientation in the positive electrode layer, wherein an active material of the positive electrode layer is made of a compound having a layered rock-salt structure when crystallized, and wherein the ratio of plane indices of the positive electrode layer satisfies the relationship (003)/(101)<10.

2. The lithium battery according to claim 1, wherein the buffer layer is made of a lithium-ion conductive oxide.

3. The lithium battery according to claim 2, wherein the lithium-ion conductive oxide is at least one type of compound selected from $Li_xLa_{(2-x)/3}TiO_3$ (x=0.1 to 0.5), $Li_{7+x}La_3Zr_2O_{12+(x/2)}$ ($-5 \leq x \leq 3$), $Li_4Ti_5O_{12}$, $Li_{3.6}Si_{0.6}P_{0.4}O_4$, $Li_{1.3}Al_{0.3}Ti_{1.7}(PO_4)_3$, $Li_{1.8}Cr_{0.8}Ti_{1.2}(PO_4)_3$, $Li_{1.4}In_{0.4}Ti_{1.6}(PO_4)_3$, $LiTaO_3$, and $LiNbO_3$.

4. The lithium battery according to claim 1, wherein the thickness of the buffer layer is 1 μm or less.

5. The lithium battery according to claim 1, wherein the electronic conductivity of the buffer layer is $1\times10^{-5}$ S/cm or less.

6. The lithium battery according to claim 1, wherein at least one compound constituting the buffer layer has diffused into the positive electrode layer.

7. The lithium battery according to claim 6, wherein the at least one compound includes $LiNbO_3$, and the Nb concentration at a position in the positive electrode layer 25 nm from the interface with the buffer layer in the thickness direction is $1\times10^{-3}$ atomic percent or more and 25 atomic percent or less.

8. The lithium battery according to claim 1, wherein the buffer layer is made of $LiNbO_3$, and no peak having a full width at half maximum of 5° or less is present in the range of 22° to 25° of 2θ in X-ray diffraction of the buffer layer.

9. The lithium battery according to claim 1, wherein the density of the buffer layer is 92% or more of the theoretical density.

10. The lithium battery according to claim 1, wherein an element constituting an active material of the positive electrode layer has diffused into the buffer layer.

11. The lithium battery according to claim 10,
wherein the positive electrode layer contains an active material containing a transition metal element, and
the mass ratio of the transition metal element to lithium in the buffer layer at the interface with the solid electrolyte layer satisfies the following formula:

$1\times10^{-4} \leq$ (transition metal element/lithium) $\leq 8\times10^{-1}$.

12. The lithium battery according to claim 1, wherein the surface roughness $R^a$ of the positive electrode layer is 1 nm or more and 40 nm or less.

13. A method of producing a lithium battery comprising:
disposing a positive electrode layer, a negative electrode layer, and a sulfide solid electrolyte layer on a substrate; and
disposing a buffer layer between the positive electrode layer and the solid electrolyte layer,
wherein an ab-axis orientation is higher than a c-axis orientation in the positive electrode layer,
wherein an active material of the positive electrode layer is made of a compound having a layered rock-salt structure when crystallized, and
wherein the ratio of plane indices of the positive electrode layer satisfies the relationship (003)/(101)<10,
wherein the sulfide solid electrolyte layer mediates conduction of lithium ions between the positive electrode layer and the negative electrode layer,
wherein the buffer layer is formed on the positive electrode layer by a vapor-phase deposition method, and
wherein the buffer layer suppresses nonuniformity of distribution of lithium ions near the interface between the positive electrode layer and the solid electrolyte layer.

14. The method of producing the lithium battery according to claim 13, wherein the buffer layer is made of a lithium-ion conductive oxide.

15. The method of producing the lithium battery according to claim 14, wherein the lithium-ion conductive oxide is at least one type of compound selected from $Li_xLa_{(2-x)/3}TiO_3$ (x=0.1 to 0.5), $Li_{7+x}La_3Zr_2O_{12+(x/2)}$ ($-5 \leq x \leq 3$), $Li_4Ti_5O_{12}$, $Li_{3.6}Si_{0.6}P_{0.4}O_4$, $Li_{1.3}Al_{0.3}Ti_{1.7}(PO_4)_3$, $Li_{1.8}Cr_{0.8}Ti_{1.2}(PO_4)_3$, $Li_{1.4}In_{0.4}Ti_{1.6}(PO_4)_3$, $LiTaO_3$, and $LiNbO_3$.

16. The method of producing the lithium battery according to claim 13, wherein the thickness of the buffer layer is 1 μm or less.

17. The method of producing the lithium battery according to claim 13, wherein the buffer layer is in an amorphous state.

18. The method of producing the lithium battery according to claim 13, wherein at least one compound constituting the buffer layer has diffused into the positive electrode layer.

* * * * *

UNITED STATES PATENT AND TRADEMARK OFFICE
CERTIFICATE OF CORRECTION

| | | |
|---|---|---|
| PATENT NO. | : 8,197,970 B2 | Page 1 of 1 |
| APPLICATION NO. | : 12/208497 | |
| DATED | : June 12, 2012 | |
| INVENTOR(S) | : Ryoko Kanda et al. | |

It is certified that error appears in the above-identified patent and that said Letters Patent is hereby corrected as shown below:

In the Claims:

In claim 8, Col. 21, line 30, should read -- "20° to 25° of $2\theta$ in X-ray --.

In claim 12, Col. 22, line 2, the word "surface roughness $R^a$ of the positive electrode" should read -- surface roughness $R\underline{a}$ of the positive electrode --.

Signed and Sealed this
Twenty-fifth Day of September, 2012

David J. Kappos
*Director of the United States Patent and Trademark Office*